United States Patent
Patel et al.

(10) Patent No.: US 11,601,495 B2
(45) Date of Patent: Mar. 7, 2023

(54) MECHANISM FOR A WORK NODE SCAN PROCESS TO FACILITATE CLUSTER SCALING

(71) Applicant: salesforce.com, inc., San Francisco, CA (US)

(72) Inventors: Yogesh Patel, Dublin, CA (US); Percy Mehta, Foster City, CA (US); Shardul Vikram, San Jose, CA (US); Mattia Padovani, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 448 days.

(21) Appl. No.: 16/779,418

(22) Filed: Jan. 31, 2020

(65) Prior Publication Data
US 2021/0243246 A1  Aug. 5, 2021

(51) Int. Cl.
| | |
|---|---|
| *H04L 67/10* | (2022.01) |
| *H04W 24/10* | (2009.01) |
| *G06F 16/22* | (2019.01) |
| *G06F 9/48* | (2006.01) |
| *H04W 4/029* | (2018.01) |
| *G06F 9/50* | (2006.01) |

(52) U.S. Cl.
CPC ............ *H04L 67/10* (2013.01); *G06F 9/4881* (2013.01); *G06F 9/5077* (2013.01); *G06F 16/2246* (2019.01); *H04W 4/029* (2018.02); *H04W 24/10* (2013.01)

(58) Field of Classification Search
CPC ...... H04L 67/10; H04W 24/10; H04W 4/029; G06F 16/2246; G06F 9/4881; G06F 9/5077
See application file for complete search history.

(56) References Cited

U.S. PATENT DOCUMENTS

| | | | |
|---|---|---|---|
| 7,730,478 | B2 | 6/2010 | Weissman |
| 10,455,264 | B2 | 10/2019 | Patel et al. |
| 10,681,499 | B2 | 6/2020 | Padovani et al. |
| 10,762,109 | B2 | 9/2020 | Rushan et al. |
| 10,817,498 | B2 * | 10/2020 | Chalakov ............ G06F 16/2219 |
| 10,904,303 | B2 | 1/2021 | Patel et al. |
| 11,138,204 | B2 | 10/2021 | Mehta et al. |
| 11,314,550 | B2 | 4/2022 | Mehta et al. |
| 11,321,139 | B2 | 5/2022 | Patel et al. |
| 2012/0110651 | A1 * | 5/2012 | Van Biljon ........... H04L 63/102 709/201 |
| 2013/0054648 | A1 | 2/2013 | Mehta et al. |
| 2014/0098813 | A1 * | 4/2014 | Mishra .................. H04L 12/185 370/390 |
| 2016/0313934 | A1 * | 10/2016 | Isherwood .......... G06F 12/0646 |
| 2018/0253458 | A1 | 9/2018 | Goyal et al. |
| 2019/0138653 | A1 | 5/2019 | Roller et al. |

(Continued)

*Primary Examiner* — Arvin Eskandarnia
(74) *Attorney, Agent, or Firm* — Nicholson, De Vos, Webster & Elliott, LLP

(57) ABSTRACT

A method and system that perform cluster node work assignments for tenants in a multi-tenant system. The method includes selecting a partition of a cluster tenant tracking structure having a hierarchical namespace and virtual nodes representing each tenant by a cluster node foreman controller, searching the selected partition for a tenant that is unlocked in the cluster tenant tracking structure, and initiating work for the tenant by the cluster node.

21 Claims, 6 Drawing Sheets

(56) References Cited

U.S. PATENT DOCUMENTS

| | | |
|---|---|---|
| 2019/0140995 A1 | 5/2019 | Roller et al. |
| 2019/0163791 A1 | 5/2019 | Sanathkumar et al. |
| 2019/0179673 A1 | 6/2019 | Gray et al. |
| 2019/0179931 A1 | 6/2019 | Gupta et al. |
| 2019/0213552 A1 | 7/2019 | Gupta et al. |
| 2019/0238604 A1 | 8/2019 | Sundaram et al. |
| 2019/0238605 A1 | 8/2019 | Patel et al. |
| 2019/0370360 A1* | 12/2019 | Mainali .................. G06F 3/067 |

* cited by examiner

MECHANISM FOR A WORK NODE SCAN PROCESS TO FACILITATE CLUSTER SCALING

TECHNICAL FIELD

One or more implementations relate to the field of data management; and more specifically, to a process and system for data stream management where work node assignments are managed using a partitioned data stream tracking tree.

BACKGROUND ART

Web applications that serve and manage millions of Internet users, such as Facebook™, Instagram™, Twitter™, banking websites, as well as online retail shops, such as Amazon.com™ or eBay™ are faced with the challenge of ingesting high volumes of data as fast as possible so that the end users can be provided with a real-time experience. The "Internet of Things" (IoT) is another major contributor to big data, supplying huge volumes of data. IoT has become a pervasive presence in the environment, with a variety of things/objects that communicate via wireless and wired connections to interact with each other and cooperate with other things/objects to create new applications/services. These applications/services exist in smart cities (regions), smart cars and mobility, smart homes and assisted living, smart industries, public safety, energy and environmental protection, agriculture and tourism. A massive quantity of data gets persisted from the millions of IoT devices and web applications.

Event management systems can be utilized to manage data distribution in these types of systems. In current event management systems, a high volume of events is published by multiple event producers and then delivered to multiple consumers. The event management system is a large scale, asynchronous, distributed system where failures are inevitable due to network failures, equipment failures and similar issues. Events are organized into different streams and sub-streams often by a topic. Publishing events as part of event streams is asynchronous.

The engagement of users that interact with software such as webpages, email programs, word processing, and similar applications and interfaces is also an important type of activity that is tracked to determine metrics that assist developers and administrators in improving and administering the software and interfaces. These engagements can be monitored by activity tracking software and collected as a set of events. This activity tracking also generates a large amount of traffic in the form of data streams that report the various types of tracked activities. In complex multi-tenant and cloud computing environments collecting and correlating the events and then generating useful metrics is resource intensive. In particular, where real-time tracking of metrics is desired even minor inefficiencies can cause significant issues and use of resources.

In some systems and architectures, event management and publishing can span multiple cloud systems that may have different resources, configurations, and software environments. In such cases, the events and similar data in each cloud system must be translated or reformatted to be passed to or upon receipt from another cloud system. Data streamers or similar software can be utilized for the data transfer. The work of transferring data streams between cloud system is assigned to a set of cluster nodes in each cloud system. The work of a particular data stream for a given organization or tenant can be assigned to a particular worker cluster node, where each worker cluster node can handle a configured number of job assignments. However, managing these work assignments does not scale well for large numbers of organizations and data streams.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 4 is a flow diagram illustrating a process of a node foreman process for selecting a tenant to perform a job for.

DETAILED DESCRIPTION

The following description describes methods and apparatus data stream management where work cluster node assignments in a cloud computing system are managed using a partitioned data stream tracking tree. The implementations modify the operation of a cluster node manager to track work assignments in a tree structure. The tree structure is partitioned to enable cluster nodes to more efficiently find and claim work. The node foreman can load a partition of the tree instead of the entire tree to look for and select a next organization or tenant to start work on. This reduces resource consumption and reduces latency in work assignments thereby improving cloud system operations.

Figure 1:
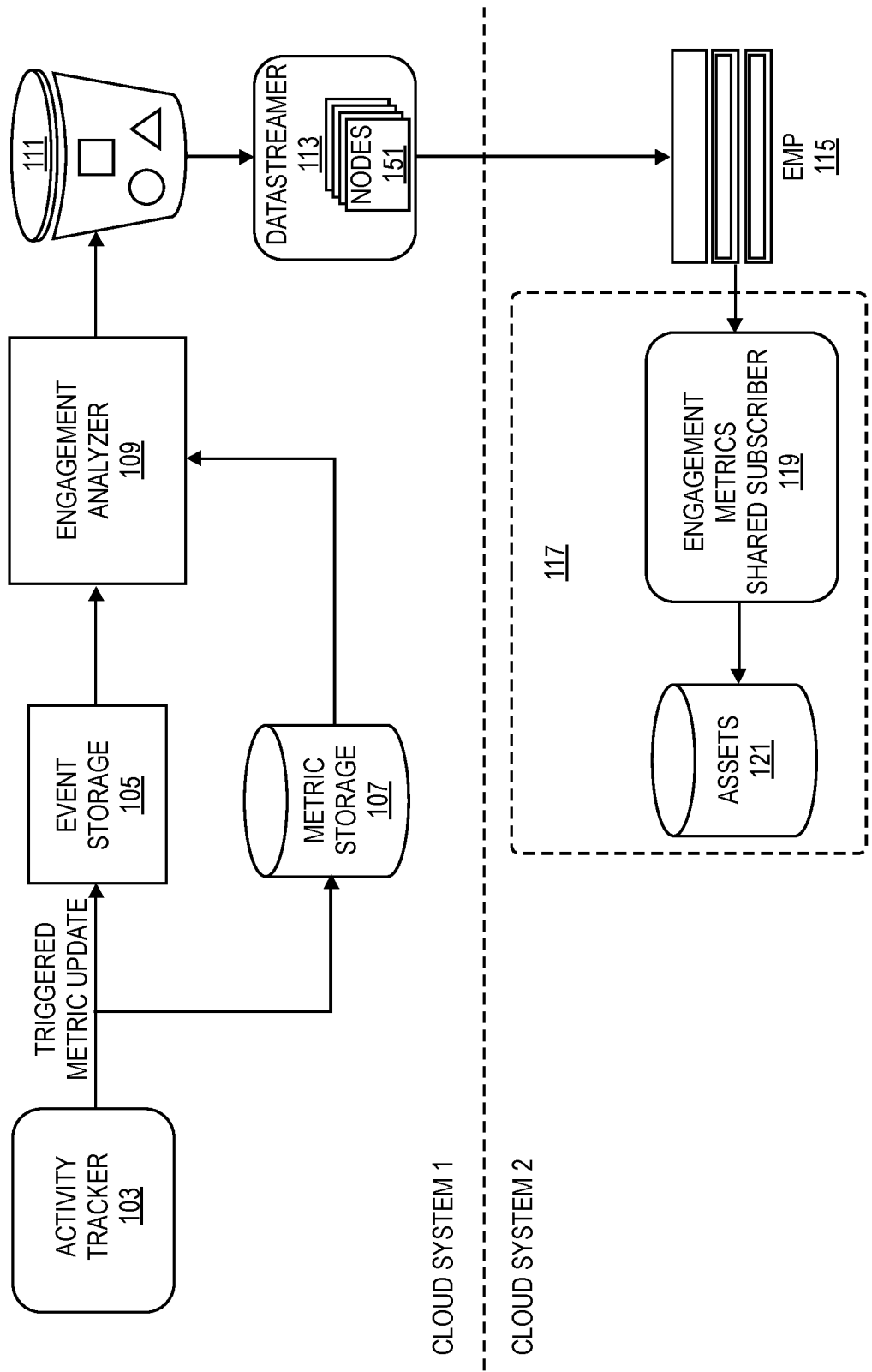
FIG. 1 is a block diagram illustrating an activity tracking architecture distributed over two cloud systems according to some example implementations.

FIG. 1 is a block diagram illustrating an activity tracking architecture according to some example implementations. The example architecture is provided by way of illustration and not limitation. One skilled in the art would appreciate that the example implementation can be applied to other contexts and architectures consistent with the principles and features described herein. The architecture includes an activity tracker 103, event storage 105, metric storage 107, engagement analyzer 109, data organizer 111, a data streamer 113, an enterprise messaging platform (EMP) 115, and tenant services 117 including engagement metrics subscription 119 and assets 121.

The components illustrated can be implemented in a multi-tenant cloud computing environment. Thus, each component can be implemented via distributed computing processes and resources. For sake of clarity and conciseness, the components are discussed as distinct software components implemented in a general multi-tenant cloud computing environment. However, one skilled in the art would understand that any number of instances of these components or distributed versions of these components can be executed in cluster nodes or similar units of execution in a cloud computing environment where the cluster nodes are managed by cluster management software or similar cloud computing environment management software. Similarly, these components can operate on or execute in virtualized software environments in combination with cloud computing environments, where instances of components execute within in any number of virtual machines or in similar virtual execution environment structures.

The activity tracker 103 can be any software capable of monitoring, and/or receiving and generating activity (also referred to as engagement) data relating to user interactions and similar software events. Any number of data streams of any number of events that report activity can be generated by the activity tracker 103. The activity tracker 103 or the event publishing portions thereof can be implemented utilizing a distributed stream processing computation framework such as Apache Storm (managed by the Apache Software Foundation). In an example implementation, the activity tracker 103 can monitor and publish collected data related to email usage. A salesperson can send out an email to more than one million recipients that includes a sales promotion. When the recipients of the email interact with the email via actions like opening, viewing, replying, clicking on a link in the email, or similar actions, each of these activities can generate an activity or event that is output from the activity tracker 103 via a message queue. The organization where the salesperson who sent the email works would like to have real time information about these activities to determine the efficacy of the sales promotion sent via the email. Other example scenarios for implementation can include a call center where multiple marketers are working on leads for sales and the call center manager wants to monitor real time statistics related to interactions of the marketers with potential customers such as numbers dialed, number of voicemails left, live call conversations, call backs, and similar data.

The output from the activity tracker 103 is a set of data streams of messages with event information. These data streams are received by an event storage 105 and a metric storage 107. The event storage 105, such as Apache Kafka (managed by the Apache Software Foundation) or similar event management or storage solution, receives the data streams and records the events from the messages in the data streams. The events can be stored in any format or schema and can be stored in any type of storage system or database management system.

In parallel, the data streams are received by a metric storage 107. Alternatively, the events can be retrieved from the event storage 105 by the metric storage 107 or related components or interfaces. The metric storage 107 is an event or data storage system (e.g., Apache Cassandra (managed by the Apache Software Foundation)). The metric storage 107 stores metrics and related data relevant to generating metrics for the data streams output by the activity tracker 103. The data accuracy manager 101 processes the data from the data streams prior to storage in the metric storage 107 to improve the efficiency of further utilizing the data by other components downstream such as the engagement analyzer 109.

As the volume of data grows from engagement monitoring and similar activity tracking, it becomes more computationally and resource intensive to process in a real-time streaming manner. The message queue that is output by the activity tracker 103 includes data from multiple organizations (i.e., tenants) in a multi-tenant environment. The types of activities monitored (i.e., assets), and the consumers of the real-time metrics (i.e., a target audience) all are part of the process for proper collection, organization, and delivery of the relevant metrics and related data. Many metrics are determined by or retrieved using queries to the metric storage 107, for example by the engagement analyzer 109.

The engagement analyzer 109 can read from the metric storage 107 to collect metric information and marshal the information for further consumption downstream. The engagement analyzer 109 can also write back relevant information and generate events to be stored in the event storage 105 or to be passed downstream. In one implementation, the engagement analyzer 109 can be implemented as an engagement writeback topology via Apache Spark (managed by the Apache Software Foundation) or similar cluster computing framework. The engagement analyzer 109 can stream data via a data organizer 111 and data streamer 113 to an enterprise messaging platform 115 to be consumed by a target user via tenant services 117.

A data streamer 113 manages the forwarding and exchange of data between platforms or cloud computing systems. In this example implementation, data is being forwarded and exchanged between a first cloud computing system providing an engagement platform and a second cloud computing system providing a tenant services platform. However, the functions distributed to the first cloud computing system and the second cloud computing system are provided by way of example and not limitation. The implementations are applicable to any type, number, or distribution of components amongst cloud computing systems such that a set of data streamers 113 are utilized to manage the exchange of data between the cloud computing systems. The data streamers are executed by a set of cluster nodes in their respective cloud computing system, where each node is a unit of execution. The operation of a cluster of nodes in a cloud computing system to perform data streaming between system or similar work is further illustrated herein below with reference to FIGS. 2-5.

In this example illustrate implementation, the enterprise messaging platform 115 receives the streams of data from the data streamer 113 where a target audience (e.g., a user of a tenant service 117) has subscribed to receive the real-time metrics via an engagement metrics subscription 119 that stores the information in a tenant assets database or similar tenant storage for consumption by the target audience via any metric viewing application or interface provided in the tenant services 117. The data streamer 113 can also handle the receipt of data from the enterprise messaging platform 115.

Figure 2:
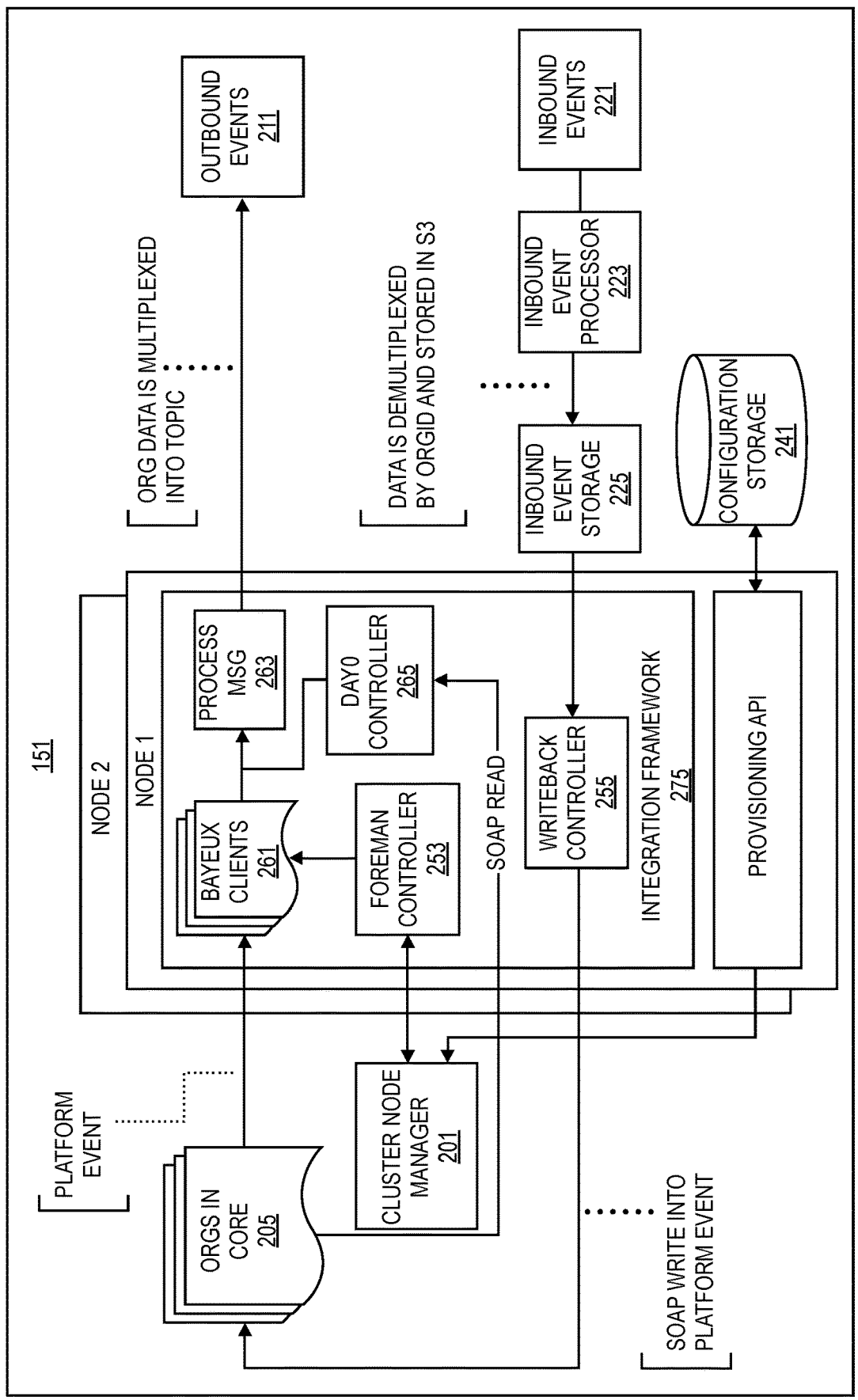
FIG. 2 is a block diagram illustrating node manager and node operations to facilitated scalable data streaming.

FIG. 2 is a block diagram illustrating node manager and node operations to facilitated scalable data streaming. The block diagram illustrates the operation of a set of cluster nodes 151 to process data streams including a set of outbound events 211 and a set of inbound events 221. The cluster nodes 151 are virtual machines, containers, or similar virtualized resources that execute a set of job. In the example implementations, the jobs are related to the processing of events or similar data in a set of data streams. In the example implementation, the cluster nodes 151 are part of a cluster that is implementing a set of data streamer instances to process events and similar streamlining messages being passed between platforms or cloud computing systems. As discussed above, a data streamer is a streaming application that consumes events from a data stream and transforms these events in the downstream direction to conform to the formats, enterprise messaging platform, or event management systems of a corresponding tenant in a multi-tenant system. The work being performed by each cluster node 151 is the transforming of event messages and similar data for a particular tenant. A cluster can have any cluster size (i.e., number of cluster nodes) to process the work for a set of tenants. A cluster node manager 201 handles the assignment of tenants (also referred to as organizations 205) to cluster nodes 151.

The example implementations provide a cluster streaming solution that is part of an overall system designed to ingest and transform a large amount of data, to apply machine learning on the data, and to produce useful metrics for users and/or tenants. Usage of engagement or activity tracking systems has increase with higher adoption rates with tenants as features have expanded in these platforms. In the illustrated example, each cluster node 151 is responsible to stream event messages for a set of organizations (i.e., tenants) that are assigned to that cluster node. Organizations are assigned by each cluster node's foreman controller 253. The foreman controller 253 and the cluster nodes 151 generally can 'compete' with other nodes in the cluster to claim organizations to service. However, each cluster node can have a maximum capacity defined in configuration (e.g., in configuration storage 241) that defines how many streaming jobs each cluster node can perform or manage. The organizations/tenants that are streaming events are tracked by a cluster node manager 201. Each organization/tenant can be identified by a unique organization identifier (OrgId).

In some implementations, the cluster node manager 201 maintains a data structure (e.g., a tree data structure) where each organization/tenant is represented as a virtual node associated with a streaming path. A streaming path is hierarchical description of a relationship between an organization/tenant and a set of data streams. In some implementations, the data structure maintained by the cluster node manager 201 enables cluster nodes 151 to coordinate with one another via a shared hierarchical namespace expressed as a path, which as applied to the example implementations is a streaming path. Each virtual node, representing an organization/tenant contains a set of data and can be of varying types. The virtual nodes can be persistent, sequential, or ephemeral types. A persistent virtual node is alive even after the organization which created that particular virtual node is disconnected. An ephemeral virtual node is active until the organization is alive. When an organization gets disconnected from the cluster node manager or the cluster, then the ephemeral virtual nodes get deleted automatically. For this reason, only ephemeral virtual nodes are not allowed to have children. A sequential virtual node can be either persistent or ephemeral. When a new virtual node is created as a sequential virtual, cluster node manager 201 sets the path of the virtual node by attaching a sequence number to the original name.

The cluster node foreman controller 253 utilizes the data structure of the cluster node manager 201 to identify additional jobs to process. The foreman controller 253 accesses the data structure and searches for virtual nodes of 'unlocked' organizations/tenants. A 'lock' is metadata tracked in the data structure that indicates a cluster node 151 is servicing streaming messages for that organization/tenant. A cluster node 151 checks for additional work upon having capacity, no current streaming job, a timeout or under similar conditions. Upon finding an unlocked organization/tenant, the foreman controller 253 claims the organization/tenant and thereby locks the virtual node. In some implementations, the lock is part of a virtual node child that has an ephemeral node type. However, accessing and searching the data structure is resource intensive as it grows in size where the cloud computing system supports a large number of organization/tenants and data streams. The example implementations ameliorate this issue by partitioning the data structure of the cluster node manager 201. The provisioning and foreman controller operation that implement the partitioning are further described with relation to FIGS. 3 and 4.

In the example implementation of FIG. 2, each cluster node 151 can include a foreman controller 253 and a set of components for managing data stream processing such as Bayeux clients 261, message processor 263, day 0 controller 265, and a writeback controller 255. Data streams with outbound events 211 are received from applications of the organizations/tenants 205 via Bayeux clients 261 that implement a Bayeux protocol for transporting asynchronous messages, for example over HTTP. Execution of the Bayeux clients can be scheduled by the foreman controller 253. These data streams can be multiplexed via the message processor 263 (e.g., as a single event topic) as an outbound event stream 211 that is sent to another cloud computing system. A day 0 controller can service simple object access protocol (SOAP) reads of the data streams of the Bayeux clients 261. The writeback controller 255 manages inbound events 221 received via an inbound event processor 223 (e.g., an Apache Spark job), and an inbound event storage 225 (e.g., an S3 interface). The writeback controller 255 processes the inbound events from the event storage 225 and reformats and passes them to the appropriate organization/tenant 205. These components can be part of an integration framework such as Apache Camel (managed by the Apache Software Foundation) within a virtual machine of the cluster node 151. In some implementations, the cluster node manager 201 can initialize and manage the components of the cluster node 151 via a provisioning application programming interface (API). Similarly, configuration of a cluster node 151 can be managed by a provisioning API from a configuration storage 241.

Figure 3:
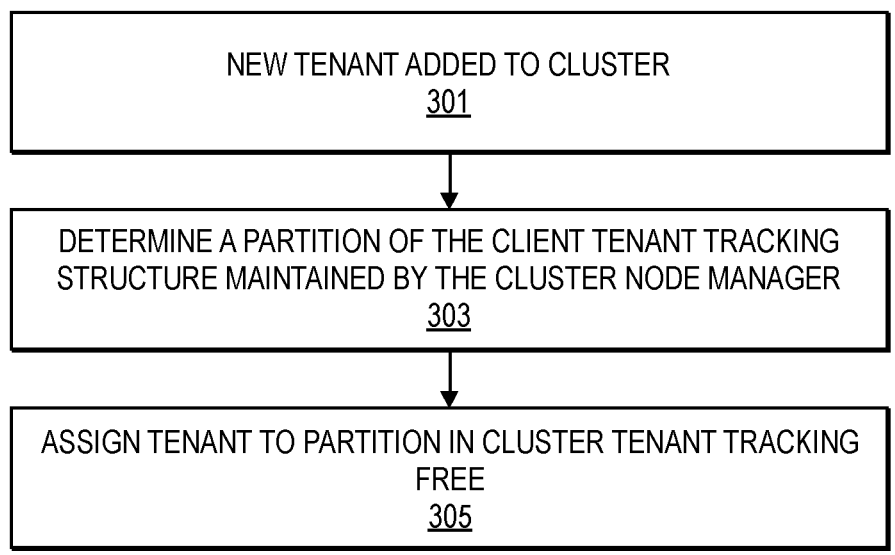
FIG. 3 is a flow diagram illustrating a process of a node manager for provisioning according to some example implementations.

FIG. 3 is a flow diagram illustrating a process of a node manager for provisioning according to some example implementations. The cluster node manager can provision an organization/tenant that is added to the system as illustrated. The new organization/tenant joins the cluster managed by the cluster node manager (Block 301). The cluster node manager receives notification of the joining organization/tenant and determines a partition of the data structure (i.e., a cluster tenant tracking structure) into which the organization/tenant is added (Block 303) maintained by the cluster node manager. An example cluster node manager can include Apache Zookeeper or similar cluster management software. The partition for the tenant can be determined by a hash of the organization/tenant (e.g., the OrgId) module the number of available partitions. With the partition determined, the organization/tenant can be added to the determined partition (Block 305). The organization/tenant can be added as a virtual node along with other relevant information such as lock status. The location of the virtual node can be based on a data stream path or similar hierarchical name space indication.

Figure 4:
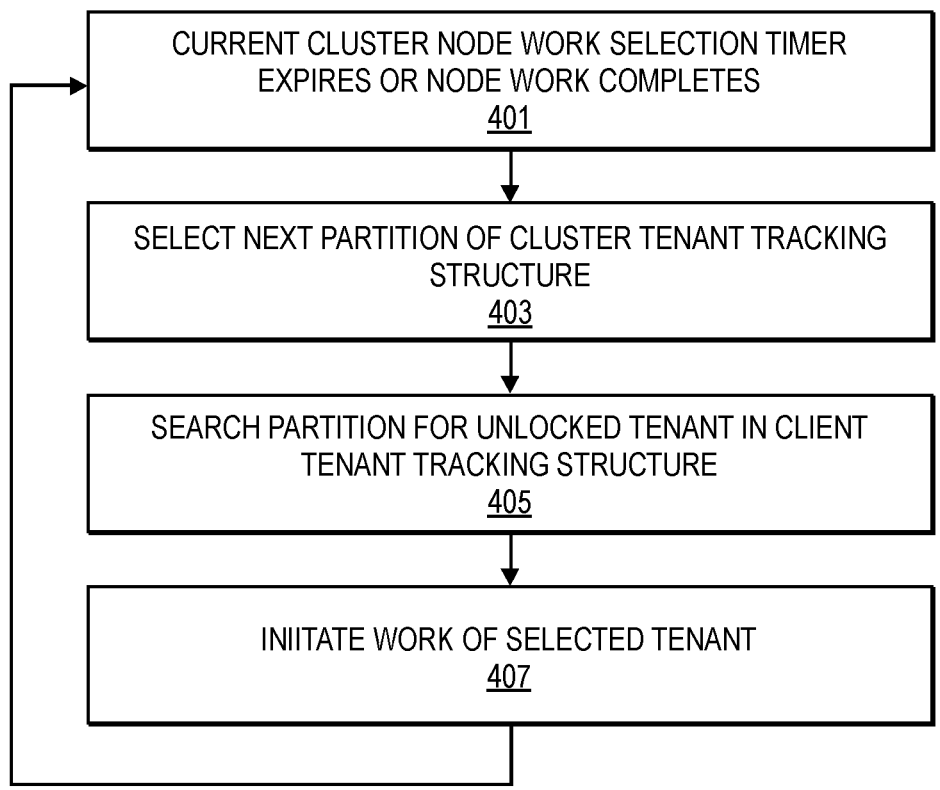

FIG. 4 is a flow diagram illustrating a process of a node foreman process for selecting a tenant to perform a job for. The cluster node foreman controller can be triggered to check for additional organization/tenants to service when there is available capacity, a timer expires, or work completes for another tenant (Block 401). The foreman controller selects a next partition of the cluster tenant tracking structure to search (Block 403). Any algorithm can be used to select a next partition, for example, a round robin process can be utilized. The partition can correlate with a sub-tree where the client tenant tracking structure is a tree structure. The foreman controller accesses and searches the selected partition of the client tenant tracking structure (rather than the entire client tenant tracking structure) to locate an organization/tenant that is not 'locked' i.e., currently serviced by another cluster node (Block 405). The foreman controller can then 'lock' the selected organization/tenant (e.g., by adding an ephemeral virtual node child indicating the lock to the client tenant structure). With the selected organization/tenant selection confirmed in the client tenant tracking structure confirmed, the cluster node can initiate work for the selected organization/tenant (Block 407).

The implementations described herein enable a cluster to scale via an improved cluster node scan strategy and tracking that is faster and less resource intensive, thereby improving cluster execution and management.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 5A:
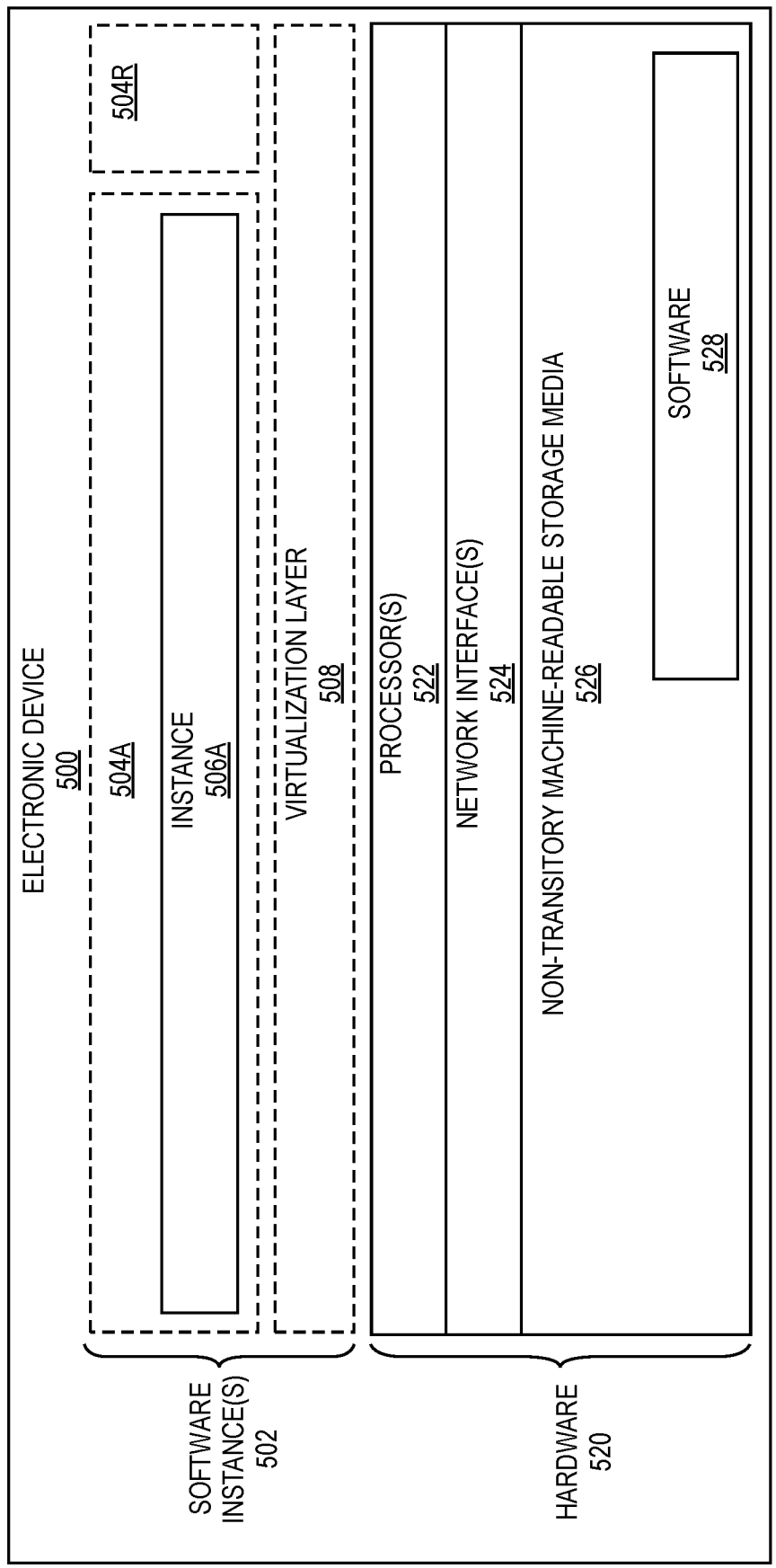
FIG. 5A is a block diagram illustrating an electronic device according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Each of the previously described components of the example architecture including the cluster node manager and foreman controller may be implemented in one or more electronic devices 500. In one implementation: 1) each of the architectural components is implemented in a separate one of the electronic devices 500 (e.g., in electronic devices operated by users or the system where the software 528 represents the software to implement architectural components including the node manager and the node foremen in conjunction with other components such as an application program interface (API) based upon protocols such as Simple Object Access Protocol (SOAP), Representational State Transfer (REST), etc.)); 2) the node manager and/or nodes with a foreman controller can be implemented in a separate set of one or more of the electronic devices 500 (e.g., a set of one or more server electronic devices where the software 528 represents the software to implement the node manager or the foreman controller); and 3) in operation, the electronic devices implementing the node manager and the foreman controller and other architectural components would be communicatively coupled (e.g., by a network) and would establish between them (or through one or more other layers) connections for streaming data and events. Other configurations of electronic devices may be used in other implementations (e.g., an implementation in which the architectural components and/or the node manager or foremen controllers are implemented on a single electronic device 500).

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 5B:
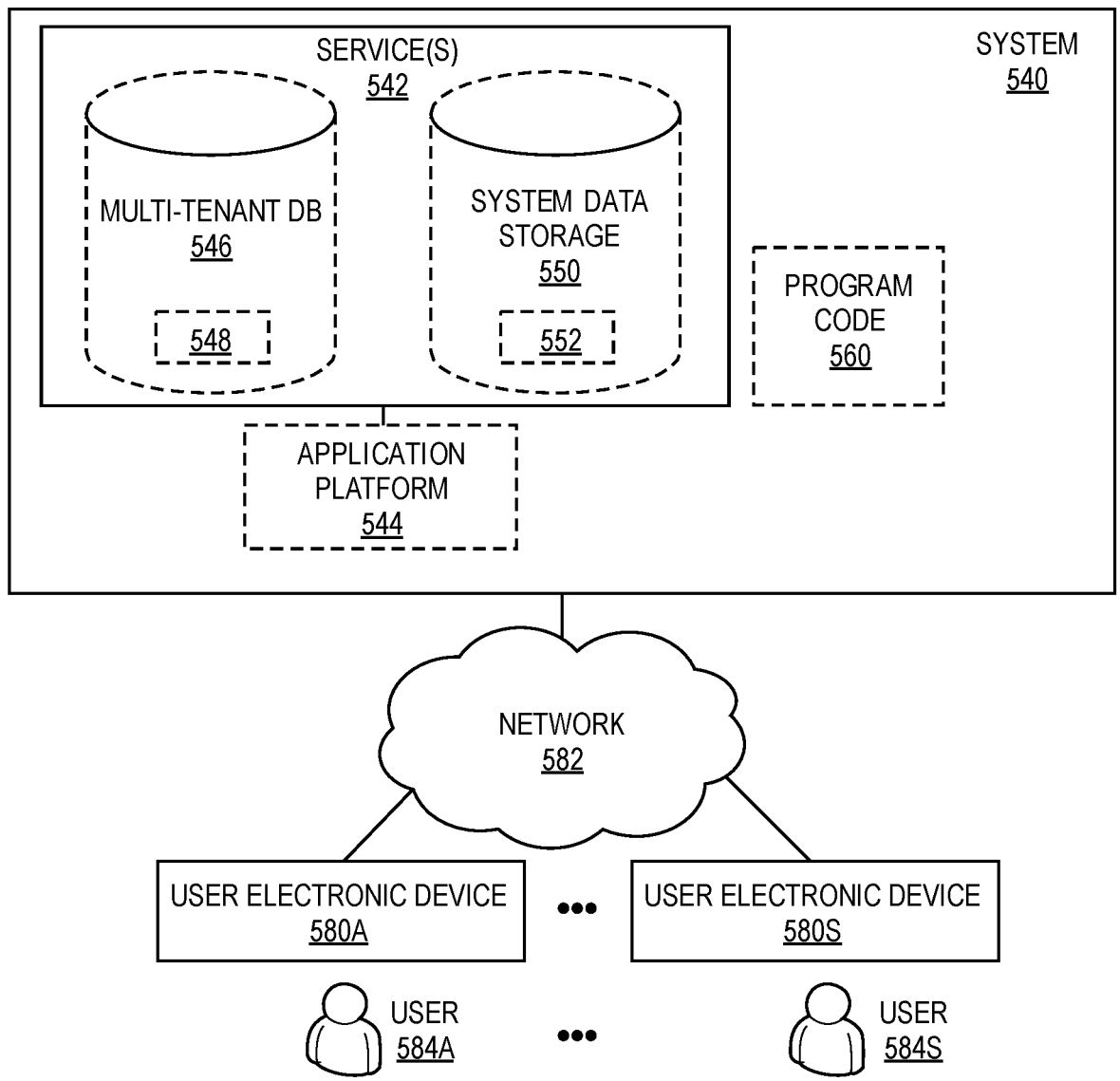
FIG. 5B is a block diagram of an environment where a data accuracy manager may be deployed, according to some implementations.

FIG. 5B is a block diagram of an environment where a cluster node manager and cluster nodes with a foreman controller may be deployed, according to some implementations. A system 540 includes hardware (a set of one or more electronic devices) and software to provide service(s) 542, including the cluster node manager and cluster nodes with a foreman controller. The system 540 is coupled to user electronic devices 580A-S over a network 582. The service(s) 542 may be on-demand services that are made available to one or more of the users 584A-S working for one or more other organizations (sometimes referred to as outside users) so that those organizations do not need to necessarily be concerned with building and/or maintaining a system, but instead makes use of the service(s) 542 when needed (e.g., on the demand of the users 584A-S). The service(s) 542 may communication with each other and/or with one or more of the user electronic devices 580A-S via one or more Application Programming Interface(s) (APIs) (e.g., a Representational State Transfer (REST) API). The user electronic devices 580A-S are operated by users 584A-S.

In one implementation, the system 540 is a multi-tenant cloud computing architecture supporting multiple services where the node manager, nodes with a foreman controller and other example architectural components or similar components, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 540 may include an application platform 544 that enables PAAS for creating, managing, and executing one or more applications developed by the provider of the application platform 544, users accessing the system 540 via one or more of user electronic devices 580A-S, or third-party application developers accessing the system 540 via one or more of user electronic devices 580A-S.

In some implementations, one or more of the service(s) 542 may utilize one or more multi-tenant databases 546 for tenant data 548, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user electronic device 580A-S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the one or more multi-tenant database 546 and/or system data storage 550.

In some implementations, the service(s) 542 are implemented using virtual applications dynamically created at run time responsive to queries from the user electronic devices 580A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the cluster node manager and cluster nodes with a foreman controller, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 540 and the user electronic devices 580A-S.

Each user electronic device 580A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 540. For example, the user interface device can be used to access data and applications hosted by system 540, and to perform searches on stored data, and otherwise allow a user 584 to interact with various GUI pages that may be presented to a user 584. User electronic devices 580A-S might communicate with system 540 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 580A-S might include an HTTP client, commonly referred to as a "browser," for sending and receiving HTTP messages to and from server(s) of system 540, thus allowing users 584 of the user electronic device 580A-S to access, process and view information, pages and applications available to it from system 540 over network 582.

Conclusion

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method of cluster node work assignment for tenants in a multi-tenant system, the method comprising:
    selecting, by a foreman controller of a cluster node, a partition of a cluster tenant tracking structure having a hierarchical namespace and virtual nodes representing each tenant of the multi-tenant system;
    searching the selected partition for a tenant of the multi-tenant system that is unlocked in the cluster tenant tracking structure; and
    initiating work for the unlocked tenant by the cluster node.

2. The method of cluster node work assignment of claim 1, wherein selecting the partition is in response to expiration of a timer for the cluster node, or an increase in work capacity of the cluster node.

3. The method of cluster node work assignment of claim 1, wherein the cluster tenant tracking structure is a tree of the virtual nodes with the hierarchical namespace, and the partition is a sub-tree of the tree.

4. The method of cluster node work assignment of claim 3, wherein the virtual nodes indicate whether a tenant is assigned to the cluster node.

5. The method of cluster node work assignment of claim 1, further comprising:
    receiving notification of a tenant joining a cluster of the cluster node by a cluster node manager.

6. The method of cluster node work assignment of claim 5, further comprising:
    assigning the tenant to a partition of the cluster tenant tracking structure by the cluster node manager.

7. The method of cluster node work assignment of claim 1, wherein selecting the partition for cluster tenant tracking structure is by round robin.

8. A non-transitory machine-readable storage medium that provides instructions that, if executed by a processor, will cause said processor to perform operations comprising:
    selecting, by a foreman of a cluster node, a partition of a cluster tenant tracking structure having a hierarchical namespace and virtual nodes representing each tenant of a plurality of tenants;
    searching the selected partition for a tenant, of the plurality of tenants, that is unlocked in the cluster tenant tracking structure; and
    initiating work for the unlocked tenant by the cluster node.

9. The non-transitory machine-readable storage medium of claim 8, wherein selecting the partition is in response to expiration of a timer for the cluster node, or an increase in work capacity of the cluster node.

10. The non-transitory machine-readable storage medium of claim 8, wherein the cluster tenant tracking structure is a tree of virtual nodes with the hierarchical namespace, and the partition is a sub-tree of the tree.

11. The non-transitory machine-readable storage medium of claim 10, wherein the virtual nodes indicate whether a tenant is assigned to the cluster node.

12. The non-transitory machine-readable storage medium of claim 8, the operations further comprising:
    receiving notification of a tenant joining a cluster of the cluster node by a cluster node manager.

13. The non-transitory machine-readable storage medium of claim 12, the operations further comprising:
    assigning the tenant to a partition of the cluster tenant tracking structure by the cluster node manager.

14. The non-transitory machine-readable storage medium of claim 8, wherein selecting the partition for cluster tenant tracking structure is by round robin.

15. A computing device in a multi-tenant environment, the computing device comprising:
    a non-transitory machine-readable medium having stored therein a foreman controller of a cluster node; and
    a processor coupled to the non-transitory machine-readable medium, the processor to execute the cluster node and the foreman controller, the foreman controller to select a partition of a cluster tenant tracking structure having a hierarchical namespace and virtual nodes representing each tenant of the multi-tenant environment, search the selected partition for a tenant of the multi-tenant environment that is unlocked in the cluster tenant tracking structure, and initiate work for the unlocked tenant by the cluster node.

16. The computing device of claim 15, wherein selecting the partition is in response to expiration of a timer for the cluster node, or an increase in work capacity of the cluster node.

17. The computing device of claim 15, wherein the cluster tenant tracking structure is a tree of virtual nodes with the hierarchical namespace, and the partition is a sub-tree of the tree.

18. The computing device of claim 17, wherein the virtual nodes indicate whether a tenant is assigned to the cluster node.

19. The computing device of claim 15, further comprising:
    a cluster node manager to receive notification of a tenant joining a cluster of the cluster node.

20. The computing device of claim 19, further comprising:
    a cluster node manager to assign the tenant to a partition of the cluster tenant tracking structure by the cluster node manager.

21. The computing device of claim 15, wherein selecting the partition for cluster tenant tracking structure is by round robin.

* * * * *